DEVICE FOR RECORDING SOUND OSCILLATIONS IN SPIRAL GROOVES ON A PLATE-SHAPED CARRIER
Filed March 22, 1954
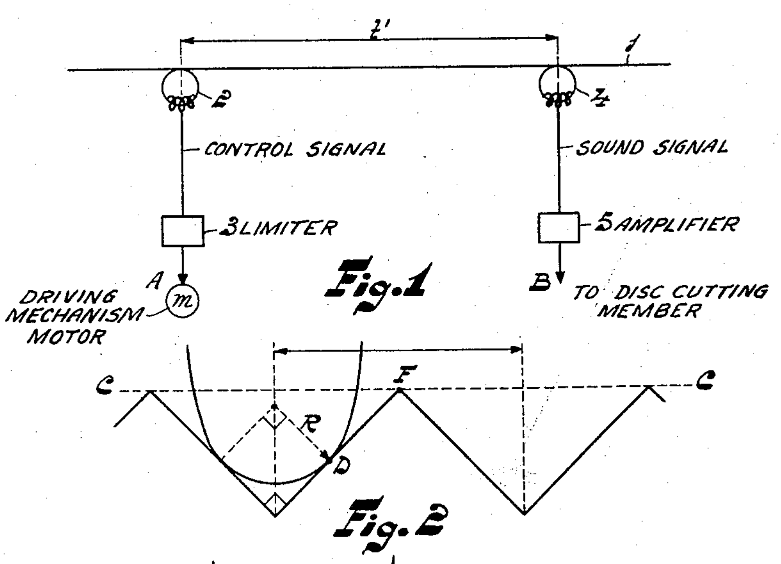
FIG. 1, FIG. 2
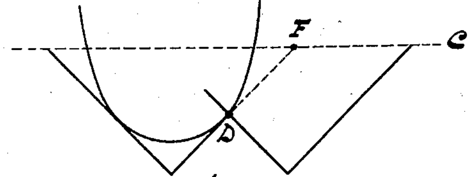
Fig. 3
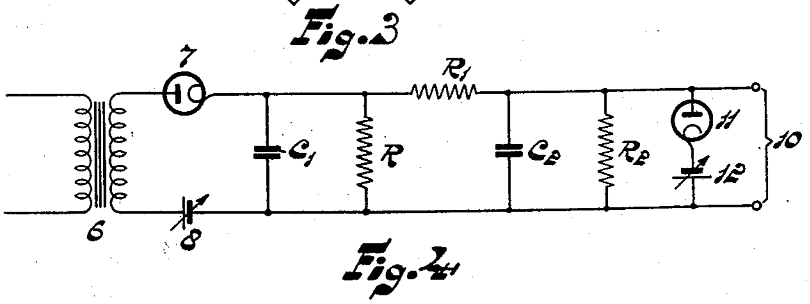
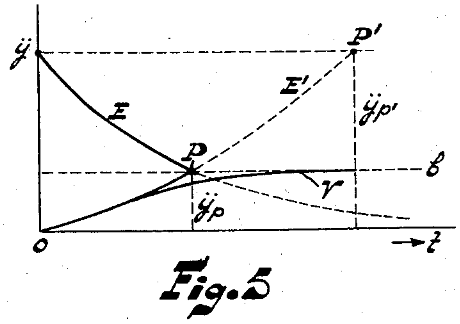
Fig. 5
INVENTORS
JAN BOONTJE
HENK LAUTERSLAGER
BY Fred M Vogel
AGENT

United States Patent Office

2,864,896

Patented Dec. 16, 1958

2,864,896

DEVICE FOR RECORDING SOUND OSCILLATIONS IN SPIRAL GROOVES ON A PLATE-SHAPED CARRIER

Jan Boontje and Henk Lauterslager, Baarn, Netherlands, assignors, by mesne assignments, to North American Philips Company, Inc., New York, N. Y., a corporation of Delaware

Application March 22, 1954, Serial No. 417,812

Claims priority, application Netherlands March 25, 1953

3 Claims. (Cl. 179—100.4)

The present invention relates to devices for recording sound oscillations in spiral grooves on a plate-shaped carrier.

If this recording is carried out, as is common practice to do, with constant pitch, a minimum value for the distance between successive grooves of the recording must be maintained in order to accommodate the excursions of the recording stylus occurring at the maximum levels of the sound oscillations. By varying this pitch by means of a control voltage having a value determined by the amplitude of the sound oscillations to be recorded and thereby varying the spacing between successive grooves of the recording, it is possible to reduce to a certain extent the losses in recording space and thereby more effectively utilize the available recording space.

It is known to achieve this variation in the spacing of the recording grooves by supplying the control voltage to the driving mechanism, for example, to the motor thereof, which is coupled to the cutting member and causes it to generate a spiral groove in the carrier. Under this condition the spacing between grooves has a small value at low signal levels and continuously increases in value as the intensity of the recording signal increases.

In order to avoid discontinuity in the form of the groove, producing distortion of the recording within the audible range, it is necessary that the changes in the grooves spacing occur at a smaller rate than the instantaneous changes in the level of the recording signal. Because of the time lag so introduced, a loss of the playing time occurs due to the fact that the condition of a wide groove spacing, which occurs at high recording signal levels, continues for a time beyond the cessation of the high level signal.

Furthermore, the delaying filter included in the control signal circuit for preventing the above cited audio distortion, exhibits an integrating action so that the strength of the control signal produced varies according to the nature of the recording signal. More particularly, a smaller control signal is produced when the recording signal has a short duration than when the recording signal has a continuous or sustained form notwithstanding the fact that both recording signals may have the same maximum amplitude and thereby require the identical spread of the grooves. If the required minimum number of grooves per radial unit of length, cut in the plate-shaped carrier, is caused to correspond to the weaker control-signal, this is unavoidably attended with an excessively severe control, corresponding to the stronger control-signal, so that also loss of useful space occurs.

With a view to these disadvantages a device according to the invention is provided with circuit elements included in the circuit of the driving mechanism, producing a limitation of the control-range of the groove spacing, both for comparatively small amplitudes and for comparatively great amplitudes of the recorded sound. More particularly, the groove spacing is maintained at a constant value for sound signals having an intensity below a given minimum threshold value. This threshold value may be so chosen with respect to the spacing between the grooves that no interaction between adjacent grooves occurs for any recording signal level below the threshold value. Furthermore, by limiting its valve, the control signal is made independent of the nature of the incoming recording signal, so that the aforesaid excessively severe control of the groove spacing is avoided. This also means a gain in useful space.

It is particularly advantageous in this case to provide the circuit of the driving mechanism with bias voltages to be adjusted separately to determine the width of the control-range.

It may furthermore be advantageous to determine the adjustment of the bias voltage by means of a voltage derived from the incoming signal, for example, by rectifying the incoming signal in well known manner to produce a bias voltage.

In order that the invention may be readily carried into effect, it will now be described with reference to the accompanying drawing.

Fig. 1 shows diagrammatically a device according to the invention and Figs. 2 and 3 are sectional views of two possible relative positions of two adjacent grooves.

Fig. 4 shows a detail arrangement of the limiting circuit of Fig. 1 and

Fig. 5 shows a few curves associated with the filter of Fig. 4.

Referring to Fig. 1, reference numeral 1 designates a carrier for magnetic recording and reproduction, on which the sound oscillations to be recorded have previously been recorded. The control-voltage, the value of which varies with the amplitude of these sound oscillations and which is produced by means of an auxiliary reproducing head, is supplied through the limiting circuit 3 to the circuit A of the driving mechanism, for example, a motor in order to determine the place of the cutting member on the plate-shaped carrier for cutting the spiral groove. As far as the recording itself is concerned, the cutting member is fed by means of the magnet head 4, supplying the sound oscillations through the amplifier 5 to the cutting member B. The relative spacing between the two magnet heads 2 and 4 is chosen to be such that, for example, the time required for the tape to travel from one head to the other corresponds to one revolution of the plate-shaped carrier.

Fig. 2 is a cross sectional view of two adjacent grooves of a recording showing the condition of zero spacing between the grooves; this means that, if no spread of the grooves has taken place the grooves are lying side by side, so that theoretically a linear hill is formed. It has been found in practice that not only over-cutting of the grooves, in which the linear hill lies below the plate surface (Fig. 3), but also spread cutting, in which the linear hill widens to form a small surface, may occur. The value of such an over-cutting or spread cutting respectively depends of course intimately upon the precision with which the adjacent grooves are cut.

In one of the grooves shown in Fig. 2, the opening of which may, for example, be 70 $\mu$ and the walls of which may be at right angles to one another, travels a playing needle having a radius of curvature R of, for example, 25 $\mu$. In practice the contact surface between the needle and the groove wall lies materially below the carrier surface C.

According to the invention the circuit of the motor includes a circuit element which limits the control-range of the groove spacing for comparatively small amplitudes of the recorded sound.

This measure is based on the recognition of the fact that owing to the absence of groove spread for signals, the strength of which remains below a threshold value such a part of the wall between two adjacent zero grooves may be cut out during recording that, to a certain extent, this is not an objection, since theoretically over-cutting of the grooves is allowed, in which case to the most the side wall DF disappears in the conditions shown in Fig. 3. Breach of the hill does not yet occur in this case, since the needle continues to follow the groove concerned. The extreme case will occur with a signal the strength of which corresponds to the threshold value. In practice an over-cutting of the zero-grooves, which may already be present as is shown, will have to be taken into account.

Fig. 4 shows the limiting circuit 3 of Fig. 1. The incoming recording signal supplied via a transformer 6 is applied to a rectifier 7 and charges the capacitor $C_1$. By means of a separately adjustable voltage source 8 the height of the threshold value, below which no conduction occurs in the rectifier 7, is determined. More particularly, by means of the bias voltage from the source 8 conduction through the rectifier 7 is prevented until the incoming audio signal level exceeds a predetermined value as determined by the adjusted value of the bias voltage.

At the output 10 of the limiting circuit the rectifier 11 is connected in series with the second, separately adjustable voltage source 12; together they provide a limitation of the demodulated signal over a given relative strength, after this signal has passed the delaying filter. The limiting element is adjusted by means of the variable voltage source 12. More particularly, by means of the voltage source 12 a biasing voltage is applied to the rectifier 11 preventing conduction through the rectifier until the signal appearing across resistor $R_2$ exceeds the threshold value of the biased rectifier. At the threshold value, the rectifier 11 begins to conduct thereby providing a shunting path of the output signal across resistor $R_2$ so that a limiting of the amplitude of the output signal is thereby achieved. This threshold or limiting value of the output signal may be adjusted to a desired value by appropriately adjusting the value of the voltage of source 12 and thereby adjusting the level at which conduction through rectifier 12 occurs. The time lag introduced by the filter must be equal to the time required for the magnetic carrier to travel from the head 2 to the head 4.

Fig. 5 shows curves associated with the delaying filter shown in Fig. 4. Curve E is the discharge curve of the capacitor $C_1$ for the case in which capacitor $C_1$ has been charged by a pulsatory signal. Capacitor $C_1$ is discharged not only through the potentiometer formed by the resistors $R_1$ and $R_2$, but also through R and by charge of the capacitor $C_2$ (curve E'). The discharge of capacitor $C_1$ and the charge of capacitor $C_2$ will continue until a stable condition is obtained (shown in Fig. 5 at point P). The control-voltage produced, corresponding to the ordinate of point P, must produce such an increase in the relative spacing between the grooves that the pulsatory incoming signal can be recorded without the risk of a breach between the grooves. If a signal of the same strength but of the continuous kind is received, the discharge curve of the capacitor $C_1$ will exhibit a horizontal course, so that the stable point lies no longer at P but at P'. The control-voltage associated herewith corresponds in value to the ordinate of P' and will thus produce an excessively severe control attended with loss of useful space, since a sufficient spread of the grooves at P has already been provided. It is therefore efficient to proportion the limits described with reference to Fig. 4 in a manner such that for an output voltage exceeding the voltage corresponding to the horizontal line *b* a limitation prevails, so that the final charging curve of capacitor $C_2$ is represented by the curve V, the voltage corresponding to the line *b* being adjusted by means of the variable voltage source 12 shown in Fig. 4.

The control-voltage obtained at the output 10 may, for example, be supplied to negatively biassed grids of tubes, the internal resistances of which constitute the resistors of an RC-filter determining the frequency of the voltage produced by an oscillator, feeding the control-motor constituted by a synchronous motor.

What is claimed is:

1. A device for recording sound oscillations in a spiral groove on a plate-shaped carrier, comprising a driving mechanism for controlling the position of a groove cutter on the carrier in response to variations of the intensity of a control signal supplied to said driving mechanism, means for deriving from said sound oscillations a control signal having an intensity as determined by the intensity of said sound oscillations greater than a predetermined threshold value, said control signal having a maximum intensity value, means for limiting the intensity of said control signal to a given value independently of variations of the intensity of said sound oscillations, said given value being greater than said threshold value, and substantially less than that of said maximum intensity, and means for applying said control signal to said driving mechanism.

2. A device for recording sound oscillations in a spiral groove on a plate-shaped carrier, comprising a driving mechanism for controlling the position of a groove cutter on the carrier in response to variations of the intensity of a control signal supplied to said driving mechanism, means comprising a first adjustable bias voltage source for deriving from said sound oscillations a control signal having an intensity as determined by the intensity of said sound oscillations greater than a predetermined threshold value, said control signal having a maximum intensity value, means comprising a second adjustable bias voltage source for limiting the intensity of said control signal to a given value independently of variations of the intensity of said sound oscillations to values greater than a predetermined second value greater than said threshold value, said given value being substantially less than that of said maximum intensity, and means for applying said control signal to said driving mechanism.

3. A device for recording sound oscillations in a spiral groove on a plate-shaped carrier, comprising a driving mechanism for controlling the position of a groove cutter on the carrier in response to variations of the intensity of a control signal supplied to said driving mechanism, means for producing a first signal having an intensity as determined by the intensity of said sound oscillation greater than a predetermined threshold value, said means comprising a first rectifier element, a first adjustable bias voltage source connected to said rectifier element, said rectifier element and said first bias voltage source being connected to the source of said sound oscillations, said threshold value being determined by the potential of said bias voltage source, a filter network coupled to the output of said rectifier element, means for limiting the intensity of output signals of said filter network to a given maximum value independently of variations of the intensity of said sound oscillations to values greater than a predetermined second value greater than said threshold value comprising a second rectifier element, a second adjustable bias voltage connected to said second rectifier element in series circuit arrangement and means for connecting said series circuit arrangement in shunt with the output of said filter network, and means for applying the output signal of said filter network as a control signal to said driving mechanism.

References Cited in the file of this patent

UNITED STATES PATENTS

| | | |
|---|---|---|
| 2,112,699 | Kleber | Mar. 29, 1938 |
| 2,333,081 | Beal | Nov. 2, 1943 |
| 2,611,038 | Graham | Sept. 16, 1952 |